United States Patent [19]

Balliet

[11] 4,257,672

[45] Mar. 24, 1981

[54] OPTICAL COUPLER FOR CONNECTING A LIGHT SOURCE TO AN OPTICAL TRANSMISSION LINE

[75] Inventor: Layton Balliet, Boca Raton, Fla.

[73] Assignee: International Business Machines Corporation, Armonk, N.Y.

[21] Appl. No.: 973,939

[22] Filed: Dec. 28, 1978

[51] Int. Cl.³ .............................................. G02B 5/14
[52] U.S. Cl. ............................. 350/96.17; 350/96.18; 350/96.20; 350/416; 350/418
[58] Field of Search ............... 350/96.15, 96.17, 96.18, 350/96.20, 175 SL, 179, 320; 250/227; 357/17

[56] References Cited

U.S. PATENT DOCUMENTS

| | | | |
|---|---|---|---|
| 3,166,623 | 1/1965 | Waidelich, Jr. | 350/175 SL |
| 3,395,331 | 7/1968 | Snitzer | 363/157 |
| 3,492,058 | 1/1970 | Waldman | 350/96.18 X |
| 3,666,347 | 5/1972 | Kitano et al. | 350/96.18 |
| 3,711,262 | 1/1973 | Keck et al. | 65/2 |
| 3,724,383 | 4/1973 | Gallaghan et al. | 350/96.18 X |
| 3,779,628 | 12/1973 | Kapron et al. | 350/96.15 |
| 3,894,789 | 7/1975 | Kobayashi et al. | 350/96.18 |
| 3,926,501 | 12/1975 | Hama | 350/96.24 |
| 3,950,075 | 4/1976 | Cook et al. | 350/96.18 X |
| 4,156,206 | 5/1979 | Comerford et al. | 350/96.18 X |

FOREIGN PATENT DOCUMENTS

| | | | |
|---|---|---|---|
| 2510043 | 9/1976 | Fed. Rep. of Germany | 350/96.18 |
| 2330022 | 5/1977 | France | 350/96.18 |
| 7605819 | 12/1977 | Netherlands | 350/96.18 |
| 600005 | 3/1948 | United Kingdom | 350/175 SL |
| 664754 | 1/1952 | United Kingdom | 350/175 SL |

OTHER PUBLICATIONS

Abram et al., "The Coupling of Light-Emitting Diodes to Optical Fibers Using . . . ," *J. Appl. Phys.*, (46/8), Aug. 1975, pp. 3468-3474.

Cunningham, "Collimated Light Source with Laser Diode and . . . Lens," *IBM Tech. Discl. Bull.*, (19/2), Jul. 1976, pp. 625-626.

Khoe et al., "A Luneberg Lens for the Efficient Coupling of a Laser Diode . . . ," *3rd Eur. Conf. Opt. Commun.*, Sep. 1977, pp. 176-178.

*Primary Examiner*—John K. Corbin
*Assistant Examiner*—John D. Lee

[57] ABSTRACT

An optical coupler for optically coupling an LED to an optical fiber includes a transparent spherical shell surrounding a transparent spherical core. The index of refraction of the core is greater than of the spherical shell. A surface is formed on the opposite side of the coupler for coupling the optical fiber to the optical coupler, and a cylinder is used to mount the optical coupler at a predetermined distance from the LED in an orientation maximizing the amount of light entering the optical fiber.

14 Claims, 3 Drawing Figures

OPTICAL COUPLER FOR CONNECTING A LIGHT SOURCE TO AN OPTICAL TRANSMISSION LINE

DESCRIPTION

1. Technical Field

The present invention relates to optical couplers for connecting a light source to an optical transmission line, and particularly relates to an optical coupler for coupling a relatively wide emission light source to an optical fiber.

2. Background Art

The use of optical transmission lines in transmitting information is increasing largely as a result of the development of small efficient optical transmission lines. One type of optical transmission line is known as an optical fiber. Such fibers typically include a transparent core surrounded by a transparent cladding material having a refractive index lower than that of the core. The core diameter is typically small, such as about 100 microns.

Low loss optical fibers have great potential for use in long distance, high data rate communication. The small size makes the fiber inexpensive to produce, and it is possible to provide a large number of fibers in a small diameter cable relative to other types of information transmission lines. However, the small size of the core makes it difficult to introduce light into the optical fiber. This difficulty is increased when a wide emission light source is used. The term "wide emission light source" will be used herein to denote a light source that produces a wide cone light pattern, typically a Lambertian light pattern, so that the light pattern increases rapidly in area as the light travels away from the light source. A light emitting diode is an example of a wide emission light source. The fiber core has an acceptance angle through which light will be received into the core. Light impinging on the core at too great an angle will not enter. The need to focus light from a wide emission light source, align the focused light with the fiber core and impinge the light upon the core within the acceptance angle has made efficient optical coupling between wide area light sources and optical fibers both difficult and expensive.

Light emitting diodes (LEDs) are low cost, wide emission, light sources often used with optical transmission lines. LEDs are preferable to semiconductor lasers as a light source when low cost and reliability are important design criteria. Even though LEDs may have light emitting areas having diameters in the range of 25 to 50 microns, LED emission light patterns are generally broad (Lambertian). This characteristic of LEDs impede efficient optical coupling with optical fibers.

One known method of optically coupling an LED to a fiber is to simply abut the end of the fiber core against the LED. However, when the LED source is small, proper alignment is difficult. When the LED source is large or the numerical aperture (acceptance angle) of the fiber core is small, this type of coupling is inefficient.

Lenses and reflectors have been used to focus and collimate a wide emission light source to provide efficient coupling with an optical fiber. However, such devices must be carefully aligned. The alignment is difficult and attendantly expensive. Lenses having a graded index of refraction have also been used to direct light into a fiber core. The expense of the graded index lens glass or other lens material is the primary drawback of this optical coupling technique.

Thus, a need has arisen for an optical coupler for optically connecting a light source to an optical transmission line that is both efficient and inexpensive relative to known coupling devices. In particular, a need has arisen for an inexpensive and efficient optical coupler for coupling an LED to an optical fiber. This need is pronounced when it is desired to couple an LED constituting a wide emission light source to an optical fiber.

SUMMARY OF INVENTION

The present invention is an optical coupler for optically coupling a light source to an optical transmission line. In accordance with the present invention, an optical coupler couples a light source to an optical transmission line. A first transparent shell portion has a first index of refraction and includes outer and inner curved surfaces. A second transparent shell portion has a second index of refraction and includes at least an inner curved surface. The first and second shell portions have oppositely oriented curvatures with the inner surfaces of the shell portions being disposed in a spaced apart opposing relationship.

A transparent core has a third index of refraction and is disposed between the first and second shell portion. The core includes first and second curved surfaces mating with the inner surfaces of the first and second shell portions, respectively, and the third index of refraction of the core is greater than the first and second indices of refraction.

Structure mounts the light source adjacent the first shell portion to allow light rays to be transmitted from the light source through the first shell portion, through the core and into the second shell portion. The optical transmission line is coupled to the second shell portion for receiving light that is transmitted by the light source.

In accordance with a particular embodiment of the present invention, a spherical lens structure is used as an optical coupler for coupling a relatively wide emission light source to an optical transmission line. The spherical lens structure is transparent to light and is comprised of a spherical core region having a first index of refraction and a spherical shell region surrounding the core region and having a second index of refraction. The first index of refraction is greater than the second index of refraction. Structure is provided for mounting the wide emission light source adjacent one side of the spherical lens structure for enabling light rays from the wide emission light source to impinge upon the spherical lens structure, and the optical transmission line is optically coupled to the opposite side of the spherical lens structure relative to the light source. In this construction, light from the light source is refracted towards a focal point as it enters the spherical shell region and as it passes from the spherical shell region into the spherical core region. The light passes out of the spherical core region into the spherical shell region and is received into the optical transmission line.

In accordance with a particular embodiment of the present invention, a cylinder having a diameter smaller than the spherical structure is used to mount the wide emission light source adjacent the spherical lens structure. The wide emission light source is mounted adjacent the center of one end of the cylinder, and the spherical lens structure is mounted on the opposite end of the cylinder relative to the wide emission light source at a predetermined distance from the wide emission light source and in an orientation maximizing the amount of light entering the optical transmission line.

In another embodiment of the present invention, the wide emission light source is mounted on a substrate, and a groove is etched in the substrate adjacent the wide emission light source. The spherical lens structure is then secured in the groove at a predetermined distance from the light source in an orientation providing the most efficient optical coupling between the light source and the optical transmission line.

BRIEF DESCRIPTION OF DRAWINGS

The present invention may best be understood by those of ordinary skill in the art by reference to the following Detailed Description when considered in conjunction with the accompanying drawings in which.

DESCRIPTION OF THE PREFERRED EMBODIMENTS

Figure 1:
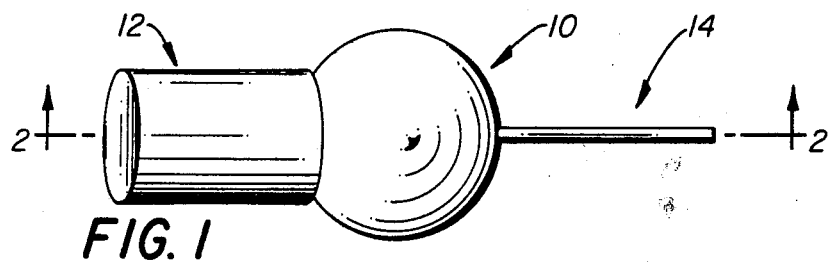
FIG. 1 is a perspective view of a spherical structure used as an optical coupler between a light source and an optical fiber.

Referring now to the drawings in which like reference characters designate like or corresponding parts throughout the several views, there is shown in FIG. 1 a spherical structure 10 for optically coupling the wide emission light source 12 to the optical fiber 14. Both the light source 12 and the fiber 14 are physically and optically connected to the spherical structure 10. As will hereinafter be described in greater detail, the spherical structure 10 acts as a lens for focusing the light from the light source 12 on the center of the optical fiber 14.

Figure 2:
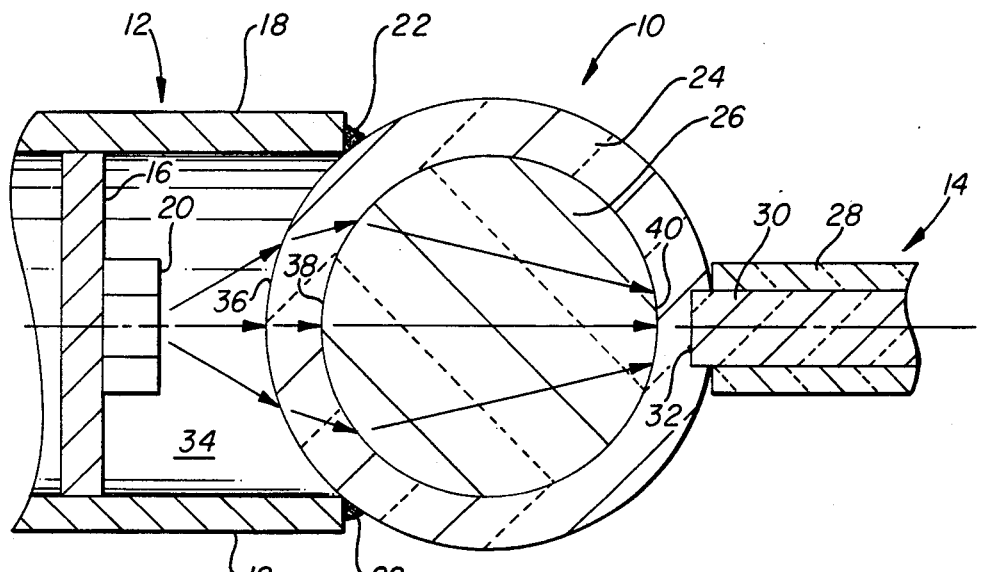
FIG. 2 is a cross sectional view showing the spherical structure mounted on one end of a cylinder.

Referring now to FIG. 2, there is shown a cross sectional view of the spherical structure 10, the light source 12 and the optical fiber 14 taken along the line 2—2 shown in FIG. 1. The light source 12 includes a mounting surface 16 with a cylinder 18 extending outwardly therefrom. An LED 20 is disposed on the mounting surface 16 in the center of one end of the cylinder 18. The spherical structure 10 is mounted in an abutting relationship on the opposite end of the cylinder 18 relative to the LED 20, and an appropriate adhesive 22 is used to secure the spherical structure 20 in the position shown in FIG. 2.

The spherical structure 10 includes an outer spherical shell region 24 and an interior spherical core region 26. The shell 24 is constructed of a transparent material having a refractive index of $n_1$, and the core 26 is constructed of a transparent material having a refractive index of $n_2$. The materials are chosen such that $n_2$ is greater than $n_1$ with the core 26 being a transparent solid or liquid material such as optical glass, optical plastic or a transparent fluid having a selected index of refraction.

The optical fiber 14 is a conventional low loss optical fiber and includes an outer cladding 28 and a fiber core 30. The fiber core 30 is transparent and is chosen to have a greater refractive index than the cladding 28. Light that is to be transmitted through the optical fiber 14 must be introduced into the fiber through the end 32 of the fiber core 30.

The LED 20 produces a wide emission light pattern, typically Lambertian. Thus, although the light emitting area of the LED 20 may have a diameter in the range of 25 to 50 microns, the area of the light pattern impinging on the spherical structure 10 is large relative to the cross sectional area of the fiber core 30. Light from the LED 20 is transmitted to the spherical structure 10 through a medium 34 having a refractive index of $N_0$ which is chosen to be smaller than the refractive index, $n_1$, of the spherical shell 24.

The arrows shown in FIG. 2 represent typical light rays emitting from the LED 20. As the light rays enter the spherical shell 24 at the convex interface surface 36, the light is refracted towards a focal point in the normal fashion for a convex lens surface. Again, as the light rays enter the spherical core 26 through the convex interface surface 38, the light is passing from a material of a smaller index of refraction to a material of a greater index of refraction, and the light is refracted in the normal fashion for a convex lens surface. The refractive indices $n_1$ and $n_2$ and the dimensions of the shell 24 and the core 26 are chosen so that the light from the LED 20 is focused by surfaces 36 and 38 towards the optical fiber core end 32. The focused light then passes through an interface surface 40 between the core 26 and the shell 24 on the opposite side of the core from the interface surface 38. The curvature of the interface surface 38 is opposite from the curvature of the interface surface 40. This light is then transmitted through the shell 24 and into the fiber core 30.

An important aspect of the present invention is the ease with which the spherical structure 10 may be used to optically couple the optical fiber 14 and the light source 12. In the preferred embodiment, a surface is formed in the shell 24 conforming to the shape of the optical core end 32. The geometry of the core end 32 may be configured to optimize the amount of light accepted by the core. In this manner, efficient optical coupling is achieved between the spherical structure 10 and the optical fiber 14. An adhesive may be used to secure the cladding 28 to the shell 24. It will be understood, however, that other conventional methods of optically connecting the optical fiber 14 to the spherical structure 10 may be used in the present invention. By first attaching the fiber 14 to the shell 24, the task of properly aligning the spherical structure 10 and the fiber 14 with the LED 20 is simplified, as hereinafter described.

After the fiber 14 has been connected to the spherical structure 10, the spherical shell 24 is abutted against the end of the cylinder 18. The cylinder 18 is chosen with a diameter smaller than the diameter of the spherical structure 10 so that the cylinder will fit flush against the spherical shell 24. The spherical structure 10 is then adjusted against the cylinder 18 to orient the structure to a position maximizing the amount of light that is input into the fiber 14. Once the optimum orientation has been achieved, the shell 24 may be adhesively secured to the cylinder 18 by means of an appropriate adhesive 22 such as epoxy cement.

The length and diameter of the cylinder 18 and the diameter of the spherical shell 24 are factors controlling the distance from the LED 20 to the outer surface 36 of the spherical shell 24. These parameters are predetermined or selected to maximize the amount of light from the LED 20 that is input into the optical fiber 14. Of course, these size parameters will be affected by other design criteria as well.

Figure 3:
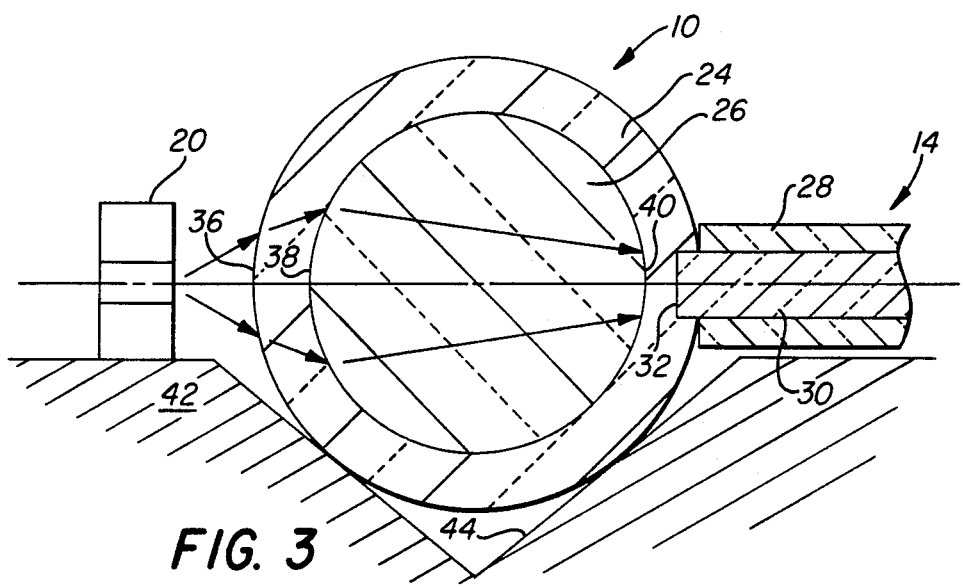
FIG. 3 is a cross sectional view showing the spherical structure mounted in a groove in a substrate adjacent the light source.

An alternate method of mounting the spherical structure 10 is shown in FIG. 3. In this embodiment, the LED 20 is mounted on substrate 42, and a groove 44 is cut in the substrate at a selected distance from the LED 20. Again, the optical fiber 14 is first connected to the spherical structure 10. Then the spherical structure 10 is positioned within groove 44 and moved along the groove until the spherical structure is positioned directly in front of the LED 20. Then the spherical structure 10 is rotated in place within the groove 44 to an orientation in which the amount of light entering the optical fiber 14 is maximized, and the spherical shell 24 is secured within the groove 44 using adhesives or by any other appropriate method.

The ability to use a liquid material as the core 26 is considered to be an important aspect of the present invention. Transparent liquids such as methylene iodide are available having variable indices of refraction from R. P. Cargille Laboratories, Inc., Cedar Groove, New Jersey. Using these liquids as the core 26, the present invention may be constructed relatively inexpensively. Although solids may also be used as the core 26, it is envisioned that solid materials having an appropriate high index of refraction will be more costly than liquids.

Although particular embodiments have been described herein, it will be understood that the invention is capable of numerous modifications, rearrangements and substitutions of parts without departing from the spirit of the invention.

Having thus described the invention, what is claimed as new, and desired to be secured by Letters Patent is:

1. An optical coupler for coupling a relatively wide emission light source to an optical transmission line having a relatively small cross sectional area comprising:

a lens structure that is transparent to light and is comprised of a core region having a first index of refraction and a shell region enclosing said core region and having a second index of refraction, the first index of refraction being greater than the second index of refraction;

means for mounting the relatively wide emission light source adjacent one side of said lens structure for impinging the light rays from the light source upon said lens structure, the light rays being refracted towards the optical transmission line by said lens structure; and means for coupling the optical transmission line to the opposite side of said lens structure from the wide emission light source for receiving light.

2. The optical coupler of claim 1 wherein said core region and shell region are each spherical.

3. The optical coupler of claim 1 wherein said means for mounting comprises:

a cylinder of a predetermined length and having a diameter that is less than the outside diameter of said shell region;

means for mounting the wide emission light source adjacent the center of one end of said cylinder; and means for securing the lens structure on the opposite end of said cylinder relative to the wide emission light source at a predetermined distance from the wide emission light source and in an orientation maximizing the amount of light entering the optical transmission line.

4. The optical coupler of claim 1 wherein said means for mounting comprises:

a substrate having the wide emission light source mounted thereon;

a groove formed in the substrate adjacent the wide emission light source; and means for securing the lens structure in said groove at a predetermined distance from the wide emission light source and in an orientation maximizing the amount of light entering the optical transmission line.

5. The optical coupler of claim 1 wherein said means for coupling further comprises a surface formed in said lens structure for conforming to the end of the transmission line.

6. The optical coupler of claim 1 wherein said core region is a liquid.

7. The optical coupler of claim 1 wherein at least one of said regions is constructed of a solid material.

8. An optical coupler for coupling a light source to an optical transmission line comprising:

a first transparent shell portion having a first index of refraction and having outer and inner curved surfaces;

a second transparent shell portion having a second index of refraction and having at least an inner curved surface, said first and second shell portions having oppositely oriented curvatures with said inner surfaces of said shell portions being disposed in a spaced apart opposing relationship;

a transparent core having a third index of refraction and being disposed between said first and second shell portions, said core including first and second curved surfaces mating with said inner surfaces of said first and second shell portions, respectively, the third index of refraction being greater than the first and second indices of refraction;

means for mounting the light source adjacent said first shell portion for impinging light rays from the light source through said first shell portion, through said core, and into said second shell portion; and means for coupling the optical transmission line to the second shell portion for receiving light that is transmitted by the light source.

9. The optical coupler of claim 8 wherein the first and second indices of refraction are equal.

10. The opitcal coupler of claim 8 wherein said means for mounting comprises:

a cylinder of a predetermined length having a diameter that is less than the diameter of the first shell portion;

means for mounting the light source adjacent the center of one end of the cylinder; and means for securing the first shell portion on the opposite end of the cylinder relative to the light source at a predetermined distance from the light source and in an orientation maximizing the amount of light entering the optical transmission line.

11. The optical coupler of claim 8 wherein said means for mounting comprises:

a substrate having the light source mounted thereon;

a groove formed in the substrate adjacent the light source; and means for securing the first and second shell portions and the core portion in the groove at a predetermined distance from the light source in an orientation maximizing the amount of light entering the optical transmission line.

12. The optical coupler of claim 8 wherein said means for coupling comprises a surface formed in said second shell portion conforming to the end of the transmission line.

13. The optical coupler of claim 8 wherein said core is a transparent fluid having a selected index of refraction and being contained by said first and second shell portions.

14. The method of optically coupling a wide emission light source to an optical transmission line comprising the steps of:

mounting the wide emission light source adjacent a first transparent shell portion;

impinging light rays from the wide emission light source on the first shell portion having a first selected index of refraction;

refracting the light rays with the first shell portion in a direction towards a transparent core portion having a second selected index of refraction that is greater than the first index of refraction;

refracting the light rays with the core portion to converge in a direction towards a second shell portion;

optically coupling the end of the optical transmission line with the second shell portion; and introducing the converged light rays into the optical transmission line.

* * * * *